US011645360B2

(12) United States Patent
Litvak et al.

(10) Patent No.: US 11,645,360 B2
(45) Date of Patent: May 9, 2023

(54) NEURAL NETWORK IMAGE PROCESSING

(71) Applicant: Ford Global Technologies, LLC, Dearborn, MI (US)

(72) Inventors: Artem Litvak, San Francisco, CA (US); Xianling Zhang, San Jose, CA (US); Nikita Jaipuria, Union City, CA (US); Shreyasha Paudel, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 191 days.

(21) Appl. No.: 17/039,511

(22) Filed: Sep. 30, 2020

(65) Prior Publication Data

US 2022/0101053 A1    Mar. 31, 2022

(51) Int. Cl.
*G06T 7/00* (2017.01)
*G06K 9/62* (2022.01)
(Continued)

(52) U.S. Cl.
CPC .......... *G06K 9/6257* (2013.01); *B60W 30/09* (2013.01); *B60W 30/0956* (2013.01);
(Continued)

(58) Field of Classification Search
CPC .. G06K 9/6257; G06K 9/6262; G06K 9/6267; G06T 7/70; G06T 2207/20081;
(Continued)

(56) References Cited

U.S. PATENT DOCUMENTS 10,474,964 B2    11/2019 Micks et al.
2019/0370666 A1    12/2019 Ros Sanchez et al.

FOREIGN PATENT DOCUMENTS

WO    2019090213 A1    5/2019
WO    2020139121 A1    2/2020

OTHER PUBLICATIONS

Apple, Inc, "Improving the Realism of Synthetic Images," Jul. 2017, Apple Machine Learning Research, whole document. (Year: 2017).*

(Continued)

*Primary Examiner* — Tyler J Lee
*Assistant Examiner* — Tiffany P Ohman
(74) *Attorney, Agent, or Firm* — Frank A. MacKenzie; Bejin Bieneman PLC (57) ABSTRACT

A computer, including a processor and a memory, the memory including instructions to be executed by the processor to determine a second convolutional neural network (CNN) training dataset by determining an underrepresented object configuration and an underrepresented noise factor corresponding to an object in a first CNN training dataset, generate one or more simulated images including the object corresponding to the underrepresented object configuration in the first CNN training dataset by inputting ground truth data corresponding to the object into a photorealistic rendering engine and generate one or more synthetic images including the object corresponding to the underrepresented noise factor in the first CNN training dataset by processing the simulated images with a generative adversarial network (GAN) to determine a second CNN training dataset. The instructions can include further instructions to train a CNN to using the first and the second CNN training datasets.

20 Claims, 8 Drawing Sheets

(51) Int. Cl.
| | |
|---|---|
| *G08G 1/16* | (2006.01) |
| *B60W 30/09* | (2012.01) |
| *B60W 30/095* | (2012.01) |
| *B60W 60/00* | (2020.01) |
| *G01C 21/34* | (2006.01) |
| *G06N 3/04* | (2023.01) |
| *G06N 3/08* | (2023.01) |
| *G06T 7/70* | (2017.01) |

(52) U.S. Cl.
CPC ..... *B60W 60/0015* (2020.02); *G01C 21/3461* (2013.01); *G06K 9/6215* (2013.01); *G06K 9/6262* (2013.01); *G06K 9/6267* (2013.01); *G06N 3/04* (2013.01); *G06N 3/08* (2013.01); *G06T 7/70* (2017.01); *G08G 1/16* (2013.01); *B60W 2420/42* (2013.01); *G06T 2207/20081* (2013.01); *G06T 2207/20084* (2013.01); *G06T 2207/30192* (2013.01); *G06T 2207/30236* (2013.01); *G06T 2207/30252* (2013.01)

(58) Field of Classification Search
CPC . G06T 2207/20084; G06T 2207/30192; G06T 2207/30236; G06T 2207/30252; B60W 60/0015; B60W 30/09; B60W 30/0956; B60W 2420/42; G01C 21/3461; G06N 3/04; G06N 3/08; G08G 1/16
USPC .......................................................... 701/26
See application file for complete search history.

(56) References Cited

OTHER PUBLICATIONS

Ezekiel, et. al., "Investigating GAN and VAE to Train DCNN", International Journal of Machine Learning and Computing, vol. 9, No. 6, Dec. 2019 (pp. 774-781) (8 pages).

Jaipuria, et. al., "On the Role of Receptive Field in Unsupervised Sim-to-Real Image Translation", Machine Learning for Autonomous Driving Workshop at the 33rd Conference on Neural Information Processing Systems (NeurIPS 2019), Vancouver, Canada (8 pages).

Liu, et. al., "Unsupervised Image-to-Image Translation Networks", 31st Conference on Neural Information Processing Systems (NIPS 2017), Long Beach, CA (11 pages).

Prakash, et. al., "Structured Domain Randomization: Bridging the Reality Gap by Context-Aware Synthetic Data", International Conference on Robotics and Automation (ICRA), Oct. 23, 2018, retrieved from Internet URL: http://arxiv.org/abs/1810.10093 (7 pages).

Tremblay, et. al., "Training Deep Networks with Synthetic Data: Bridging the Reality Gap by Domain Randomization", IEE Computer Society Conference on Computer Vision and Pattern Recognition Workshops, Apr. 23, 2018, retrieved from Internet URL: http:// arxiv.org/abs/1804.06516 (9 pages).

\* cited by examiner

NEURAL NETWORK IMAGE PROCESSING

BACKGROUND

Computing devices, networks, sensors and controllers to acquire data regarding the environment and identify and locate objects based on the data. Object identity and location data can be used to determine routes to be traveled and objects to be avoided by a vehicle. Operation of a vehicle can rely upon acquiring accurate and timely data regarding objects in a vehicle's environment while the vehicle is being operated on a roadway.

BRIEF SUMMARY

Disclosed herein is a method, including determining a second convolutional neural network (CNN) training dataset by determining an underrepresented object configuration and an underrepresented noise factor corresponding to an object in a first CNN training dataset, generating one or more simulated images including the object corresponding to the underrepresented object configuration in the first CNN training dataset by inputting ground truth data corresponding to the object into a photorealistic rendering engine generating one or more synthetic images including the object corresponding to the underrepresented noise factor in the first CNN training dataset by processing the simulated images with a generative adversarial network (GAN) to determine a second CNN training dataset and training the CNN using the first and the second CNN training datasets. An image acquired by a sensor can be input to the trained CNN and output an object label and an object location corresponding to the object corresponding to the underrepresented object configuration and underrepresented object noise factor. A second underrepresented noise factor can be determined that corresponds to the CNN not outputting the object label and the object location corresponding to the object by testing the CNN with a test dataset based on real world images, one or more synthetic images including the object corresponding to the second underrepresented noise factor can be generated to determine a third CNN training dataset by inputting images from the first training dataset and the second training dataset into the GAN and the CNN can be retrained using the third training dataset to output a second object label and a second object location corresponding to the second underrepresented noise factor using the first, second and third CNN training datasets. The first object configuration can be underrepresented when a number of images in the first CNN training dataset that include the first object configuration is less than an average number of images that include each other object configuration. The first noise factor can be underrepresented when a number of images in the first CNN training dataset that include the first noise factor is less than an average number of images that include each other noise factor.

The first and second CNN training datasets can include images that include the object and corresponding ground truth that includes the object label and the object location for the object included in the images. Training a second CNN with the second CNN training dataset can reduce false positives output by a first CNN trained with the first CNN training dataset when processing real-world data, wherein a false positive is an object label incorrectly applied to an object occurring in an image. The object label can be a text string that identifies an object included in an input image and the object location is a bounding box corresponding to the object included in the input image. Object configurations can include values and an arrangement of pixels corresponding to the object based on an object location, an object orientation, and partial obscuring of the object by another object and/or another object's shadow. Noise factors can include values and an arrangement of pixels corresponding to the object based on environmental conditions including partial or full sunlight, precipitation including rain or snow, fog, and dust. The photorealistic rendering engine can be a software program that inputs ground truth data regarding object configuration and outputs an image of a traffic scene that appears as if it were acquired by a real-world camera. The GAN can be trained to generate simulated images by training the GAN with real-world images that include noise factors. Training the GAN with real-world images cam include comparing an image output by the GAN with input real-world images to determine similarity between the image output by the GAN with input real-world images by correlating the output images with the input real-world images. The CNN can include convolutional layers that output hidden variables to fully-connected layers that output states that include the object label and object location. The CNN can be trained to output states corresponding to the object label and object location by processing an input image a plurality of times and comparing the output states to ground truth data corresponding to the input image.

Further disclosed is a computer readable medium, storing program instructions for executing some or all of the above method steps. Further disclosed is a computer programmed for executing some or all of the above method steps, including a computer apparatus, programmed to determine a second convolutional neural network (CNN) training dataset by determining an underrepresented object configuration and an underrepresented noise factor corresponding to an object in a first CNN training dataset, generate one or more simulated images including the object corresponding to the underrepresented object configuration in the first CNN training dataset by inputting ground truth data corresponding to the object into a photorealistic rendering engine generating one or more synthetic images including the object corresponding to the underrepresented noise factor in the first CNN training dataset by processing the simulated images with a generative adversarial network (GAN) to determine a second CNN training dataset and train the CNN using the first and the second CNN training datasets. An image acquired by a sensor can be input to the trained CNN and output an object label and an object location corresponding to the object corresponding to the underrepresented object configuration and underrepresented object noise factor. A second underrepresented noise factor can be determined that corresponds to the CNN not outputting the object label and the object location corresponding to the object by testing the CNN with a test dataset based on real world images, one or more synthetic images including the object corresponding to the second underrepresented noise factor can be generated to determine a third CNN training dataset by inputting images from the first training dataset and the second training dataset into the GAN and the CNN can be retrained using the third training dataset to output a second object label and a second object location corresponding to the second underrepresented noise factor using the first, second and third CNN training datasets. The first object configuration can be underrepresented when a number of images in the first CNN training dataset that include the first object configuration is less than an average number of images that include each other object configuration. The first noise factor can be underrepresented when a number of images in the first CNN training dataset that include the first noise factor is less than an average number of images that include each other noise factor.

The computer can be further programmed to include the first and second CNN training datasets images that include the object and corresponding ground truth that includes the object label and the object location for the object included in the images. Training a second CNN with the second CNN training dataset can reduce false positives output by a first CNN trained with the first CNN training dataset when processing real-world data, wherein a false positive is an object label incorrectly applied to an object occurring in an image. The object label can be a text string that identifies an object included in an input image and the object location is a bounding box corresponding to the object included in the input image. Object configurations can include values and an arrangement of pixels corresponding to the object based on an object location, an object orientation, and partial obscuring of the object by another object and/or another object's shadow. Noise factors can include values and an arrangement of pixels corresponding to the object based on environmental conditions including partial or full sunlight, precipitation including rain or snow, fog, and dust.

The photorealistic rendering engine can be a software program that inputs ground truth data regarding object configuration and outputs an image of a traffic scene that appears as if it were acquired by a real-world camera. The GAN can be trained to generate simulated images by training the GAN with real-world images that include noise factors. Training the GAN with real-world images cam include comparing an image output by the GAN with input real-world images to determine similarity between the image output by the GAN with input real-world images by correlating the output images with the input real-world images. The CNN can include convolutional layers that output hidden variables to fully-connected layers that output states that include the object label and object location. The CNN can be trained to output states corresponding to the object label and object location by processing an input image a plurality of times and comparing the output states to ground truth data corresponding to the input image.

DETAILED DESCRIPTION

A computing device in a traffic infrastructure system can be programmed to acquire data regarding the external environment of a vehicle and to use the data to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more objects such as vehicles and pedestrians, etc., in an environment around a vehicle and can be used by a computing device in the vehicle to operate the vehicle.

A computing device in a vehicle can be programmed to determine object labels and object locations based on image data acquired by a sensor included in the vehicle. The object labels and object locations can be based on a configuration of an object in the image data. An object label is a text string that describes or identifies an object in an image. The object can be a vehicle, for example a car, a truck, or a motorcycle. An object configuration is defined as the location, size and appearance of an object in an image. An object configuration can correspond to values and arrangements of pixels based on the object location, object orientation and appearance of the object. The appearance of the object can vary based on partial or full obscuring of the object in the image data by other objects in the image or shadows from other objects, for example. The appearance of the object in the image data can also be affected by noise factors. Noise factors can be determined for environmental conditions including full or partial sunlight, and precipitation including rain or snow, fog and dust, for example.

An image acquired by a video camera can be processed to determine a location of one or more objects, including accounting for noise factors. For example, a video camera included in a vehicle can acquire an image of a traffic scene. The acquired image can be communicated to a computing device in the vehicle. The computing device can include a software program such as a convolutional neural network (CNN) that has been trained to determine labels for objects that occur in the acquired image. A CNN will be described below in relation to FIG. 2. The CNN can also determine an object location based on the acquired image. Because the sensor is in a fixed position with regard to the vehicle and the vehicle and the object are both assumed to be positioned on a ground plane defined by a roadway, a location of an object in an image can be processed by a CNN to yield real world coordinates of the object with respect to the vehicle. The computing device can use the determined object label and object location to operate the vehicle. For example, the computing device can determine a vehicle path that avoids contact with the labeled object. A vehicle path can be a curve or curves (including a line or lines) described by one or more polynomial equations upon which the vehicle can be instructed to operate by the computing device by controlling vehicle powertrain, braking and steering. The polynomial curve can be determined to maintain upper and lower limits on lateral and longitudinal accelerations, thereby providing efficient operation of the vehicle.

Software programs such as CNNs depend upon training to determine object labels in image data. A CNN can be trained by presenting the CNN with a large number (typically >1000) of training images that include objects along with corresponding ground truth. Ground truth data is data that specifies a correct solution, in this example the label and location for an object in an image, obtained from a source independent from the CNN to be trained. In this example ground truth regarding the training images can be obtained by having a human determine a label and location for an object in an image by visual inspection of the image. In other examples a human can determine the object label and object location by observing and measuring the real world traffic scene at the time the image is acquired. During training the CNN processes an input image and the result, referred to herein as an output state, is compared to the ground truth to train the CNN to produce an output state that matches the ground truth in response to inputting an image that corresponds to the ground truth.

Producing a training dataset of images, and corresponding ground truth, for training a CNN can be an expensive and time consuming process, i.e., is inefficient and challenging in terms of consumption of computing resources. Further, a trained CNN has limited ability to generalize beyond the training dataset. A CNN can be successfully trained to correctly detect objects such as passenger vehicles, trucks and motorcycles using a dataset that includes a sample of passenger vehicles, trucks, and motorcycles, for example. Detecting an object is defined as determining a location for the object in an image by determining a bounding box for the object and determining a text string that identifies the object within the bounding box. A bounding box is rectangle with sides parallel to the top, bottom, left and right sides of the image, respectively. A CNN trained to detect passenger vehicles, trucks, and motorcycles might not be able to successfully detect a vehicle if the image of the vehicle includes a confusing background, or the image of the vehicle is partially obscured by another vehicle, foliage, or shadows. A confusing background is defined as an image that includes features that are close enough in appearance to a vehicle that a trained CNN will generate false alarms, where a false alarm is defined as an output state that includes a labeled object where no such object occurs in the input image. Also, environmental conditions including weather, lighting, and shadows can prevent a CNN from successfully detecting an object. A CNN trainer tries to anticipate as many of the types of objects the CNN will be required to label along with as many of the environments in which the objects will occur as permitted by the time and resources available for training.

Successful training of a CNN can depend upon having sufficient examples of a vehicle type in a particular configuration. As defined above with regard an object, a vehicle configuration in this context is defined as the location, size and appearance of a vehicle in an image. As discussed above, vehicle appearance can be based on other objects in the image including other vehicles, the roadway and objects such as overpasses, barriers, medians, etc. A sufficient number of examples can typically be greater than 100. Successful training of a CNN can depend upon having sufficient examples (typically >100) of a vehicle type in the presence of particular noise factors. Noise factors are defined as environmental conditions that change the appearance of a vehicle in an image. These environmental conditions include rain, snow, fog, dust, etc. and lighting conditions which can range from direct sunlight to nighttime. For example, direct or bright sunlight can cause shadows that alter the appearance of vehicles in an image.

Motorcycles are an example of a vehicle object that presents difficulty in obtaining a sufficient number of images of the object (i.e., the motorcycle) in different configurations to successfully train a CNN to determine vehicle labels and locations for a motorcycle in input images. Successful training of a CNN to determine vehicle labels and locations for a motorcycle can also depend upon obtaining a sufficient number of images of each configuration with a sufficient variety of noise factors. Successful determination of a vehicle label and location for a motorcycle in a given configuration and noise factor can depend upon training the CNN with a plurality of images that include a motorcycle in a given configuration and the given noise factors. For example, successful determination of a label and location for a motorcycle in a particular configuration in the rain can depend upon training a CNN with a plurality of images of motorcycles in that configuration in the rain.

Motorcycles can present several challenges in obtaining sufficient numbers of images for training a CNN. Motorcycles are typically smaller than other vehicles and it can be difficult to obtain clear images of motorcycles due to the motorcycles being obscured by larger vehicles and their shadows. Motorcycles also tend not to be present in inclement weather situations. Some configurations and noise factors can present a danger to a motorcycle rider. For example, in some states "lane splitting", where a motorcycle can travel between other vehicles along a lane marker separating lanes on a roadway is legal. In other examples riding a motorcycle in an ice storm can be dangerous to the rider. Motorcycle datasets are typically collected under high speed driving environments, which results in motion blur in the image data. This type of motion blur is hard to generate in simulated images, therefore processing simulated images to produce synthetic images can improve realism in the images. Simulated and synthetic images are defined in relation to FIGS. 6 and 7, below. Motion blur is defined in relation to FIG. 7, below.

Techniques discussed herein improve the operation of a CNN in labeling and locating objects, including but not limited to motorcycles, by simulating and synthesizing additional images of an object in configurations and noise factors underrepresented in a training dataset. Underrepresentation is defined by classifying images according to object configurations and noise factor and then comparing the number of images that include a particular configuration and/or noise factor to the average number of images for each configuration and/or noise factor. For example, if, in a training dataset, the average number of images in which any vehicle type is partially obscured is n, and the number of images that include partially obscured motorcycles in less than n, then the configuration that includes "partially obscured motorcycles" is underrepresented.

Figure 1:
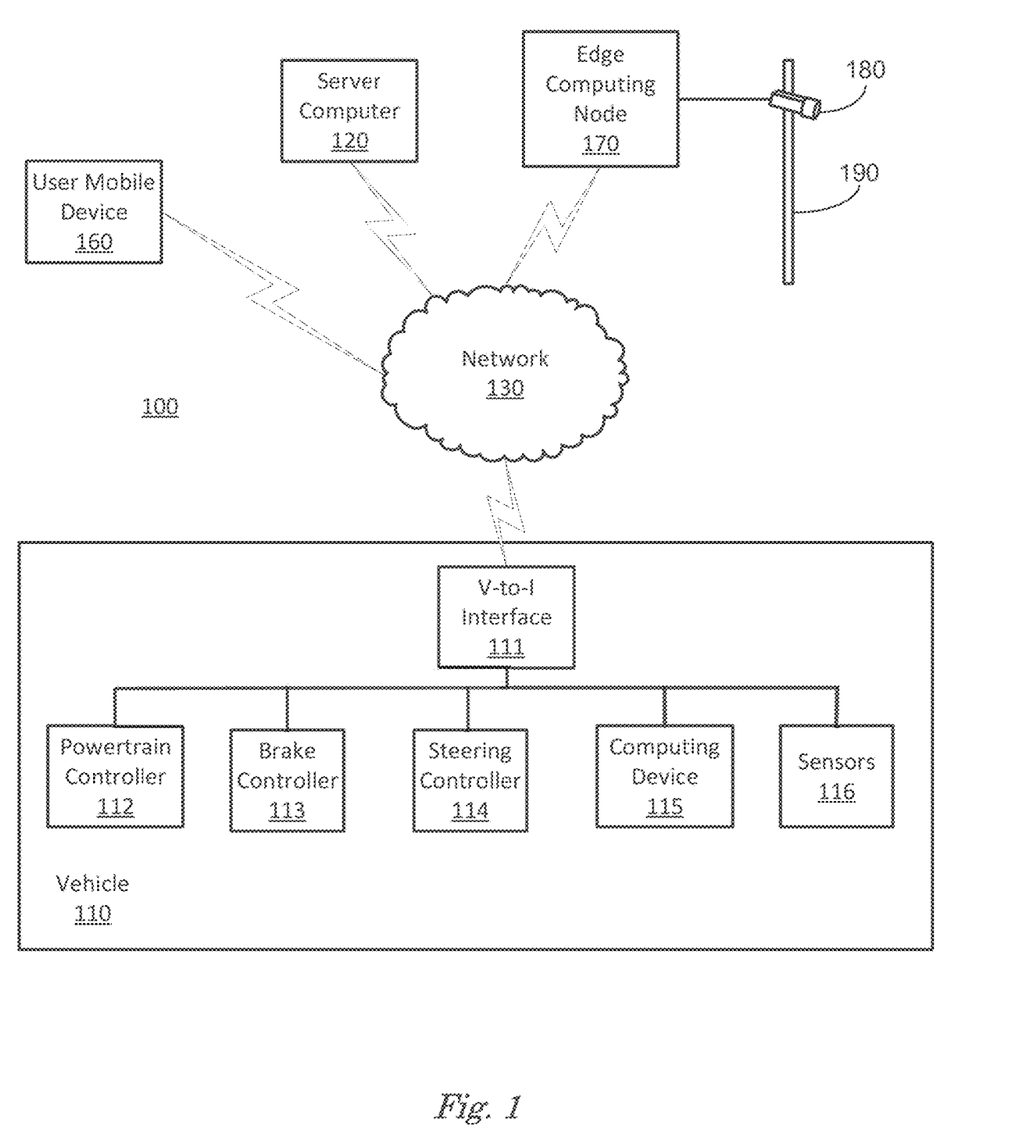
FIG. 1 is a diagram of an example traffic infrastructure system.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land based vehicle 110 capable of autonomous and/or-semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Traffic infrastructure system 100 can include one or more edge computing nodes 170. Edge computing nodes 170 are computing devices as described above that are located near roadways, and can be in communication with stationary or moveable sensors 180. For example, a sensor 180 can be a stationary video camera attached to a pole 190, building, or other stationary structure to give the sensor 180 a view of traffic. Mobile sensors 180 can be mounted on drones or other mobile platforms to provide views of traffic from positions not available to stationary sensors. Edge computing nodes 170 further can be in communication with computing devices 115 in vehicle 110, server computers 120, and user mobile devices 160 such as smart phones. Server computers 120 can be cloud-based computer resources that can be called upon by edge computing nodes 170 to provide additional computing resources when needed.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
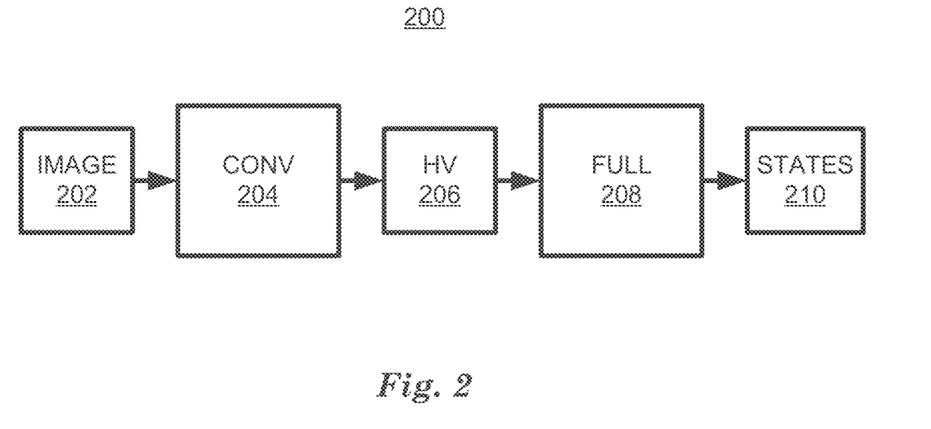
FIG. 2 is a diagram of an example convolutional neural network.

FIG. 2 is a diagram of a CNN 200. A CNN 200 is a software program that can execute on a computing device 115 included in a vehicle 110. A CNN 200 inputs and processes an image 202. An image 202 can be acquired by a video camera included as a sensor 116 in a vehicle 110, for example. An image 202 can also be acquired by a sensor 180, which can be a video camera, included in a traffic infrastructure system 100 and communicated to the CNN 200 in a computing device 115 by an edge computing node 170 via a network 130. CNN 200 processes an input image 202 and produces output states (STATES) 210 that include an object label and an object location for the object label.

A CNN includes convolutional layers (CONV) 204. Convolutional layers 204 use a plurality of convolutional kernels to reduce an input image 202 to hidden variables (HV) 206. The hidden variables 206 are an encoded representation of the input image 202 that includes data corresponding to objects in the input image 202. The hidden variables 206 are input to fully connected layers (FULL) 208 that process the hidden variables 206 to produce output states 210 corresponding to an object label and an object location for the object label. A CNN 200 can be trained to output an object label and an object location for the object label by processing hidden variables 206 with fully connected layers 208. A CNN 200 can output more than one object label each with corresponding object location for each object occurring in an input image 202.

A CNN 200 can be trained to input an image 202 and output states 210 including object labels and object locations using a training dataset that includes training images 202 that include objects and ground truth corresponding to the objects included in the images. As defined above, ground truth includes labels for the objects obtained independently from the CNN 200. For example, a human can view the training images 202 in the training dataset and determine object labels. As defined above, an object label is a text string corresponding to a bounding box that locates an object in an image. The location of the bounding box in the image can be processed to yield a location for the object in real world coordinates. An object location corresponding to the object label can be determined by measuring the location of the object in real world coordinates in the real-world traffic scene corresponding to the training image 202. Real world coordinates specify a location in the real, i.e., physical, world, and typically are three dimensional coordinates measured with respect to a global coordinate system such as latitude, longitude, and altitude. The object location can also be estimated using photogrammetry techniques on the training image. Photogrammetry is a technique that uses measurements in pixels of locations of objects in an image, and data regarding real-world of measurements of objects such as height and width of a make and model of vehicle, to determine real-world locations of objects in an image.

A training image 202 can be input to a CNN 200 and a plurality of tests can be run while varying the parameters used to program the convolutional layers 204 and fully connected layers 208. After each run of a plurality of tests the output states 210 are back-propagated to compare with the ground truth. Back-propagation is a technique that returns output states 210 from a CNN 200 to the input to be compared to ground truth corresponding to the input image 202. In this example, during training a label and a location can be back-propagated to be compared to the label and location included in the ground truth to determine a loss function. The loss function determines how accurately the CNN has processed the input image 202. A CNN 200 can be executed a plurality of times on a single input image 202 while varying parameters that control the processing of the CNN 200. Parameters that correspond to correct answers as confirmed by a loss function that compares the output states 210 to the ground truth are saved as candidate parameters. Following the test runs, the candidate parameters that produce the most correct results are saved as the parameters that will be used to program the CNN 200 during operation.

Figure 3:
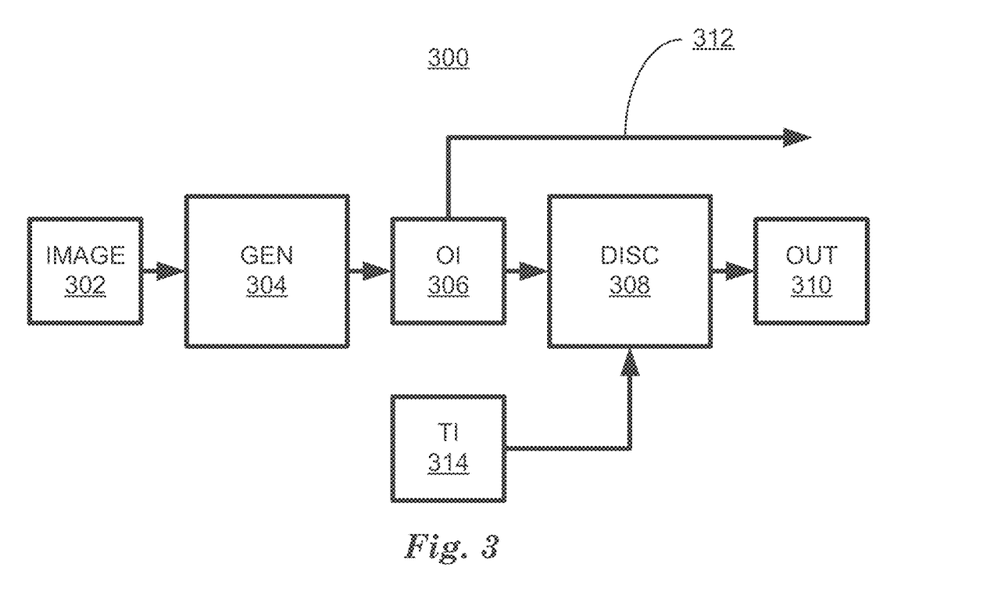
FIG. 3 is a diagram of an example generative adversarial network.

FIG. 3 is a diagram of a generative adversarial network (GAN) 300. A GAN is a neural network that can be trained to input data, for example an image (IMAGE) 302 and output 312 an output image (OUT) 306 that has been processed by the generative layers (GEN) 304 of GAN 300 to alter the appearance of the input image 302. For example, a GAN 300 can be trained to input images 302 that include objects in full sunlight. A GAN 300 can be trained to alter the input images 302 to appear as if they were acquired in environmental conditions including shadows, dim lighting, nighttime, rain, snow, fog, etc. A GAN 300 can be used to generate output images 306 that correspond to underrepresented noise factors in a training dataset for a CNN 200. For example, if images including an object traveling on a roadway in the rain are underrepresented in a training dataset, images of the object traveling on a roadway in clear conditions can be input into an appropriately trained GAN 300 to produce images of the object traveling on a roadway while it is raining. In this fashion, images corresponding to underrepresented noise factors can be added to a training dataset to train a CNN.

A GAN 300 can be trained to produce output images 306 that include a selected noise factor by first training a discriminator (DISC) 308 to discriminate between images that include the selected noise factor and images that do not include the selected noise factor. A discriminator 308 is trained by inputting training images (TI) 314, a portion of which include the selected noise factor, along with ground truth ("yes" or "no") that indicates whether each training image 314 includes the selected noise factor. In this fashion discriminator 308 is trained to determine an output value (OUT) 310 that indicates whether an output image 306 input to the discriminator includes selected noise factor or not.

In examples where a discriminator 308 is trained with real world images as training images 314, the output value 310 can be regarded as a determination as to whether the output image 306 input to the discriminator 308 is "real" or "fake"

by training the discriminator 308 to emit an output value 310 of "real" for input training images 314 that include the selected noise factor and "fake" for input training images 314 that do not include the noise factor. "Real" and "fake" are binary values corresponding to logical "true" and "false" or 1 and 0. In this context, "real" refers to images that appear similar to the real world images used to train the discriminator 308 and "fake" refers to an output image that does not appear similar to a real world image. For training purposes, "real" and "fake" images are determined by human observers.

The generator 304 can be trained to generate output images 306 that appear "real" and the discriminator 308 is trained to distinguish between "real" and "fake" training images 314 in a stepwise simultaneous fashion. In stepwise simultaneous training, the generator 304 can be trained to generate output images 306 that are determined by the discriminator 308 to be "real" in response to input images 302 that do not include the selected noise factor by dividing the training dataset in to a plurality of epochs or portions. The generator 304 is trained on one or more epochs of the training dataset while the discriminator 308 is held constant. The discriminator 308 is then trained on one or more epochs of the training dataset while the generator 304 is held constant. This process is repeated until the GAN 300 converges, i.e. until the generator 304 produces images that are correctly determined to be "real" by the discriminator 308 based on ground truth at a rate that is determined to be acceptable by a user, for example 90%. For example, a GAN 300 can be trained to input an input image 302 that includes a daylight, summer scene and output 312 an output image 306 that includes the same scene altered to look as if the image were acquired at night, in the winter, in a snowstorm.

Figure 4:
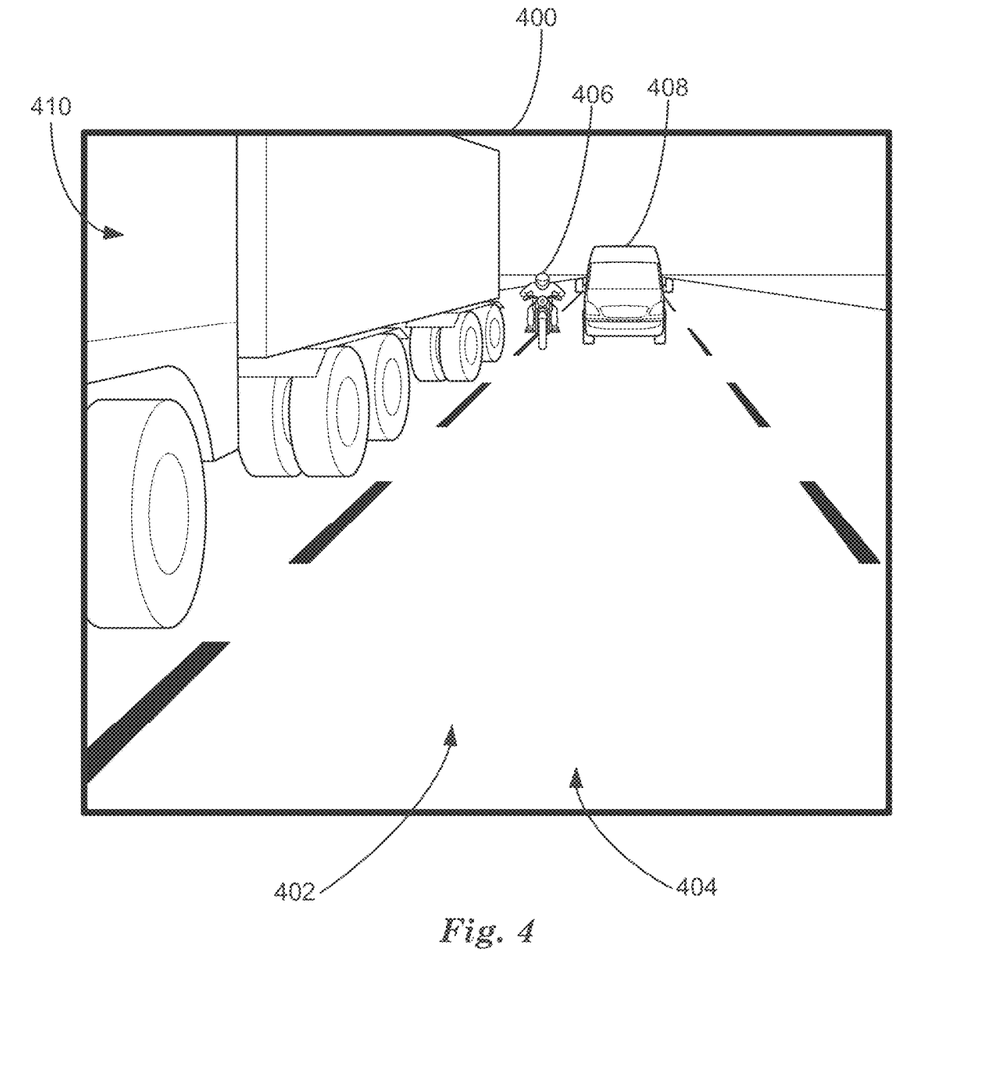
FIG. 4 is a diagram of an example image of a traffic scene.

FIG. 4 is a diagram of an image 400 of traffic scene 402. Image 400 can be acquired by a camera included in a vehicle 110, for example a rear-facing camera. Traffic scene 402 includes a roadway 404, and on the roadway 404 a motorcycle 406. The motorcycle is lane splitting between a vehicle 408 and a large truck 410. In traffic scenes like traffic scene 402, a motorcycle 406 can be maneuvering at higher speeds than the surrounding traffic, including vehicle 408 and large truck 410. Because of the higher speeds and sometimes unpredictable motion of vehicles like motorcycle 406, a CNN 200 executing on a computing device 115 in a vehicle 110 should label and locate the motorcycle 406 as soon as possible to permit computing device 115 to determine if a response is necessary and execute the response. A response to the presence of a motorcycle 406 might be to move over within a lane to permit the motorcycle to lane split next to the vehicle, for example.

Motorcycle labeling and location using a CNN 200 requires large amounts of training data, typically including >1000 images, with diversity in motorcycle shapes and sizes, occlusion types (neighboring cars, buses, trucks), shadows (from neighboring trees, vehicles etc.), ground types (cement, gravel, asphalt), weather conditions (dry, wet, snowy grounds), etc. As discussed above, collecting such diverse real-world datasets is costly and resource-intensive. This is why open-source CNN 200 training datasets typically have a small percentage of motorcycles in them. For example, in the widely popular KITTI dataset, available from the Karlsruhe Institute of Technology, 76131 Karlsruhe, Germany, only 0.7% of the objects are motorcycles. Similarly, the more recent BDD100K dataset, available from Berkeley Artificial Intelligence Research, University of California, Berkeley, Berkeley, Calif., is much bigger and claims to be more diverse but has only 0.04% of its objects as motorcycles. Neither of these datasets include enough images to be able to train CNN 200 to be a robust motorcycle detector. Acquiring a real-world dataset of motorcycle images and corresponding ground truth data sufficient to train a CNN 200 could require thousands of man hours.

As discussed above, real-world training dataset distributions are often skewed towards vehicle configurations and noise factors that are easy to collect. This can lead to a CNN 200 performing poorly in scenarios that are not well-represented in the training dataset, which for the task of motorcycle detection also happen to be the ones that are most pertinent. Furthermore, datasets are typically divided into training data and testing data portions. A CNN 200 is trained using the training dataset and then tested using the testing dataset based on real world images and ground truth to determine accuracy metrics such as the percentages of true and false positive labeling. A true positive is defined as a correct location or object label corresponding to the ground truth and a false positive is defined as an incorrect location or object label corresponding to the ground truth. The CNN 200 not outputting the object label and the object location corresponding to the object when testing the CNN 200 is defined as a true positive rate of less than 90% or a false positive rate of greater than 10%. Additionally, accurate ground truth is essential for reliable performance of any supervised learning algorithm. Ground truth annotation of real-world data is currently done by humans using dedicated software tools. This process is both error-prone and time-consuming.

Techniques described herein improve the training of a CNN 200 to label and locate objects that are underrepresented in training datasets by generating simulated images with photorealistic rendering software that include objects in underrepresented configurations and then processing the simulated images with a GAN 300 to produce synthetic images that include a plurality of noise factors. Simulated images can be generated using photorealistic rendering software. Photorealistic rendering software is also referred to as game engine software because it is also used to generate images for video game software. A photorealistic image is defined as an image that appears almost as if it were acquired by a real world camera viewing a real world scene. Example photorealistic rendering software is aDRIVE, a software program developed at Ford Greenfield Labs, Palo Alto, Calif. 94304. The aDRIVE software can be used to generate realistic views of traffic scenes including simulated video sequences to aid in development of automated vehicle software, for example. For purposes of training a CNN 200 as discussed herein, simulated images produced by photorealistic rendering software are not sufficiently realistic to produce training images that include complex configurations of objects such as motorcycles with a plurality of different noise factors. Techniques discussed herein improve CNN 200 training datasets by processing simulated images with a GAN 300 to produce synthetic images that include realistic object configurations with a plurality of noise factors.

Photorealistic rendering software can input a scene description that includes a location and size of a roadway and the location and types of foliage and buildings around the roadway. The scene description also includes the location, size and types of vehicles on or around the roadway. The scene description also includes the intensity, location and type of lighting for the scene. For example, a scene description can include a three-lane highway with grass in the median and low bushes next to the highway, a large truck in the left-most lane, a van in the center lane and a motorcycle between the large truck and the van. The scene can be an evening daylight scene with a shadow from the large truck partially obscuring the motorcycle. This scene description can be input to photorealistic rendering software produce an image similar to image 400. Because input to the photorealistic rendering software includes the location and size of vehicles and other objects such as barriers and lane markers, ground truth corresponding to the output image is available for training a CNN.

Images simulated by the photorealistic rendering software, without significant investment in time, money and computing resources on graphics expertise, typically lack the realism that can be used to successfully train a CNN 200. Thus, a GAN 300 can be used to automatically and efficiently translate simulated images into more photorealistic images. Additionally, a GAN 300 can be used to diversify real images by adding a plurality of noise factors. For example, the photorealistic rendering software can produce images that appear as if they were acquired in clear weather at various times of the day or night. A GAN can be trained to input the photorealistic images and output images that appear as if they were acquired in rain that can vary from light to heavy, in snow that can vary from light to heavy at various seasons and with various levels of lighting including artificial lights. i.e. streetlights. Synthetic images produced in this fashion can be used to augment and improve the diversity of real-world datasets specifically for training, validation and testing of CNN-based motorcycle detection.

Figure 5:
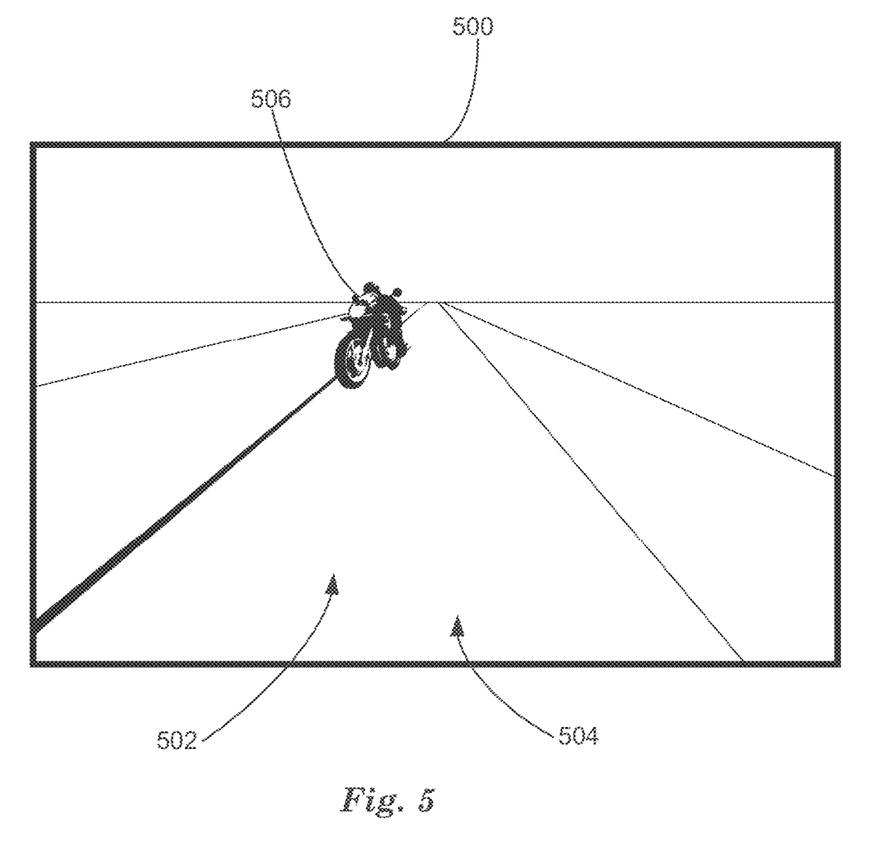
FIG. 5 is a diagram of another example image of a traffic scene.

FIG. 5 is a diagram of an image 500 of a traffic scene 502 that includes a roadway 504 and a motorcycle 506. Image 500 can be acquired by a camera included in a vehicle 110. As discussed above, acquiring a real world image that includes a motorcycle 506 in a given configuration is uncommon in existing training datasets. Acquiring a real world image like image 500 can require renting a motorcycle 506, hiring a rider and then arranging the motorcycle 506 and one or more additional vehicles 110 in various configurations. Adding in acquiring real world images and acquiring ground truth with a variety of noise factors can increase the time, expense and resources involved in acquiring the image data and corresponding ground truth greatly.

Figure 6:
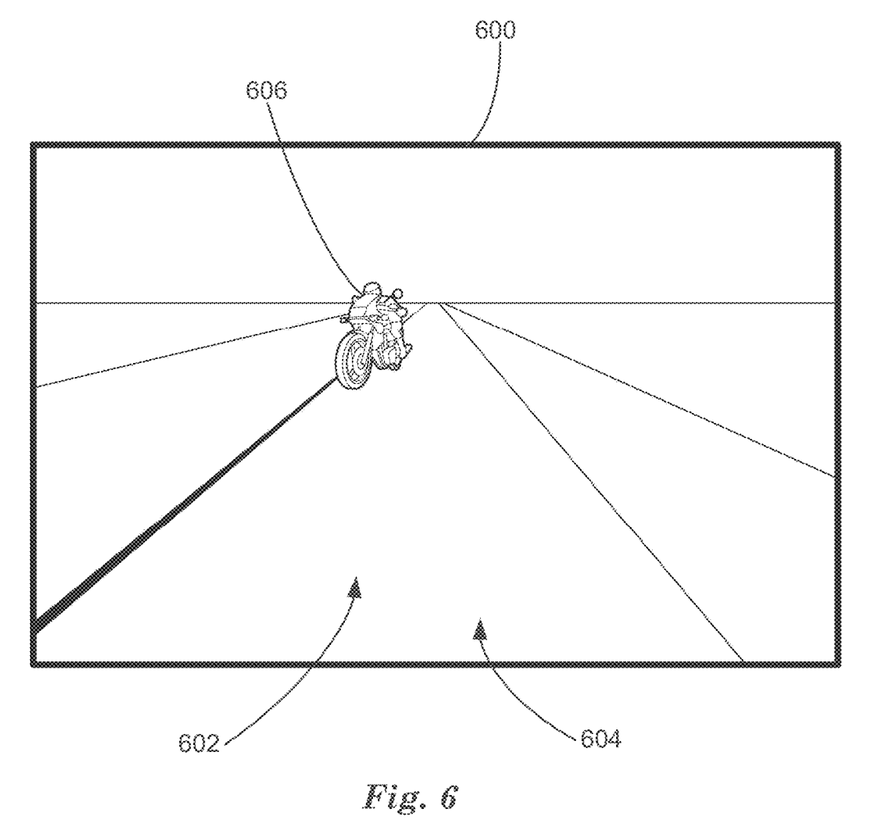
FIG. 6 is a diagram of an example simulation image.

FIG. 6 is a diagram of a simulated image 600 of a traffic scene 602 that includes a roadway 604 and a motorcycle 606. Simulated image 600 can be generated by photorealistic rendering software such as aDRIVE, discussed above in relation to FIG. 4. The photorealistic rendering software can generate a simulated image 600 of a traffic scene 602 based on scene descriptions that include the location and size of a roadway 604 and the location and size of a motorcycle 606 described in relation to the roadway 604. Because the simulated images 600 are generated from scene descriptions that include the location and size of the objects in the simulated image 600, ground truth corresponding to the image is included. A plurality of simulated images 600 including a motorcycle 606 in a variety of different configurations and including a variety of other objects including vehicles can be generated more quickly and less expensively than acquiring real world images of a motorcycle 606.

Figure 7:
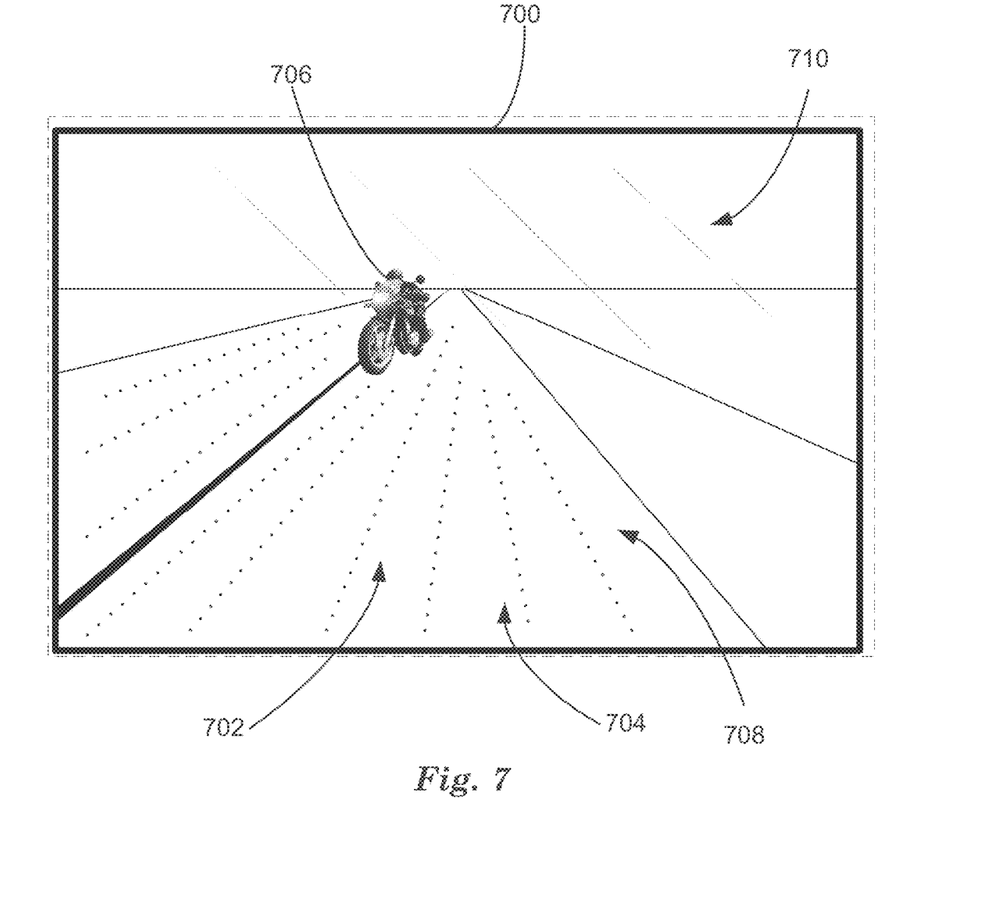
FIG. 7 is a diagram of an example synthetic image.

FIG. 7 is a diagram of an image 700 of a traffic scene 702 that includes a roadway 704 and a motorcycle 706. Image 700 is a synthetic image 700 generated by inputting a simulated image 600 into a GAN 300 that has been trained to add realistic noise factors to simulated images 600. Adding noise factors to a simulated image 600 to form a synthetic image 700 can make the simulated image 600 appear more realistic and add environmental conditions to the simulated image 600. For example, synthetic image 700 includes motion blur (dotted lines) 708 and rain (dashed lines) 710. Motion blur is an optical phenomenon present in image data caused by motion of the camera or object being captured. A GAN 300 can also be used to add realistic noise factors to real world training images. For example, real world training images acquired in daytime can be processed by a GAN 300 to appear as if they were acquired at nighttime. If a particular point is moving with respect to the image plane of the sensor while a camera shutter is open, or while a video frame is being acquired, the point will create a streak or blur in the image. A plurality of simulated images 600 can be generated corresponding to underrepresented vehicle configurations and then processed to form synthetic images 700 that include a plurality of noise factors corresponding to underrepresented noise factors. Because the synthetic images 700 include corresponding ground truth, photorealistic synthetic images 700 including noise factors can be generated at much less expense and in much less time than acquiring real world images to train a CNN 200.

Synthetic images 700 can be used to generate a second training dataset for retraining a CNN 200 to correctly output object labels and object locations for object configurations and noise factors that are underrepresented in training datasets based solely on real world images. As discussed above object configurations corresponding to motorcycles can be underrepresented in training datasets for a CNN 200. Underrepresented object configurations with underrepresented noise factors can be remedied by generating synthetic images that include the underrepresented object configurations and processing the synthetic images with a GAN 300 to produce simulated images that include underrepresented object configurations with underrepresented noise factors. For example, images that include motorcycles lane splitting in the rain can be underrepresented in a training dataset based on real world images. Techniques described herein remedy the underrepresented object configurations and noise factors more efficiently, thereby saving time and expense by using photorealistic rendering software and GANs 300 to produce simulated images to be included in a second training dataset. A CNN 200 retrained using the second training dataset in addition to the first training dataset will be more likely to produce correct object labels and correct object locations in response to real world input images that include motorcycles in object configurations with noise factors underrepresented in the first training dataset that only includes real world images.

The process of generating simulated images for training a CNN 200 can be iterative. For example, the CNN 200 can be tested to determine whether the CNN 200 can correctly label input images with >90% accuracy, i.e. does the label output by the CNN 200 match the label included in the ground truth for greater than 90% of the input images. Locating a labeled object with >90% accuracy can include determining a location for the object with less than 10% error with respect to the distance from the object to the sensor as determined by the ground truth data. For example, a CNN 200 can be expected to label and locate objects such as motorcycles in all object configurations and noise factors available in a test dataset with 90% accuracy. If 90% accuracy is not achieved by the CNN 200 following retraining with the second training dataset, a third training dataset can be generated corresponding to the object configurations and noise factors that were unsuccessfully labeled and located by the CNN 200 after retraining. The CNN 200 can be again retrained using the first, second, and third datasets and the CNN 200 the re-tested using a test dataset that includes real world image data and real world ground truth corresponding to the real world image data. This process can repeat until 90% accuracy in achieved by the CNN 200.

Figure 8:
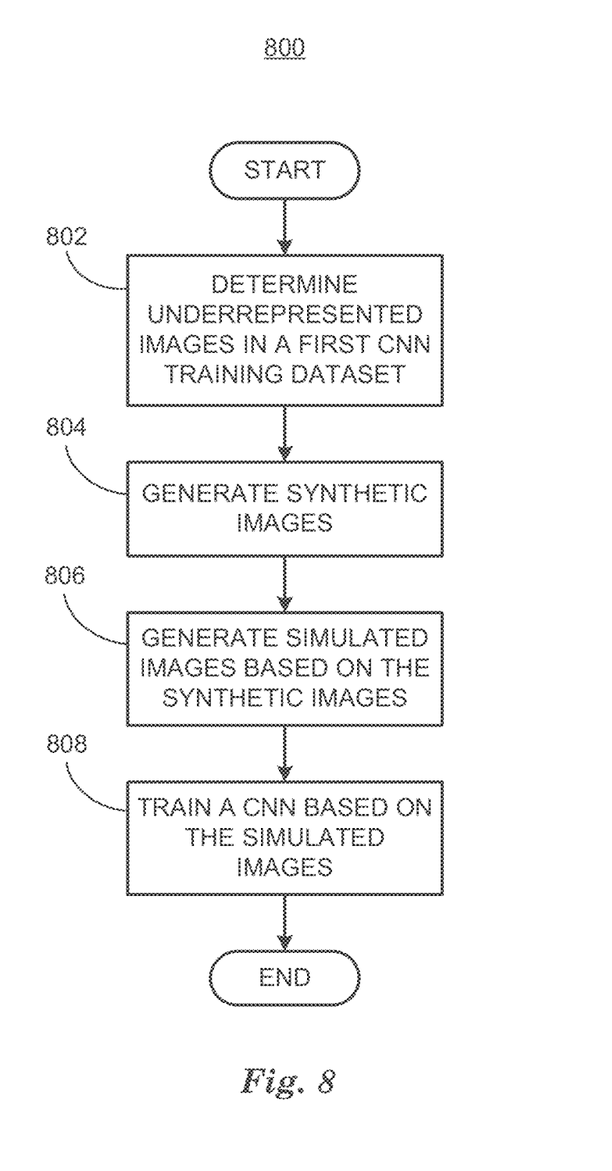
FIG. 8 is a flowchart diagram of an example process to determine an object label.

FIG. 8 is a diagram of a flowchart, described in relation to FIGS. 1-7, of a process for labeling and locating objects in images. Process 800 can be implemented by a processor of computing device, taking as input information from sensors, and executing commands, and outputting object information, for example. Process 800 includes multiple blocks that can be executed in the illustrated order. Process 800 could alternatively or additionally include fewer blocks or can include the blocks executed in different orders.

Process 800 begins at block 802, where a training dataset is analyzed to determine underrepresented object configurations and noise factors. For example, motorcycles 406 have been determined to be underrepresented in training datasets used to train CNNs 200 used to operate vehicles 110. Examples of underrepresented object configurations that can apply to motorcycles 406 include motorcycles 406 that are partially obscured by other vehicles or vehicle shadows. Other object configurations that can apply to motorcycles 406 include small images, where a small number of pixels correspond to the image of the motorcycle 406 due to distance and image where the motorcycle 406 appears in an unexpected location. Underrepresented noise factors include images where the motorcycle 406 or the background is subject to motion blur due to motion of the motorcycle 406 or the camera acquiring the image.

At block 804 the computing device 115 a computing device 115 generates synthetic images 600 based on scene descriptions corresponding to underrepresented object configurations using game engine software. The scene descriptions include ground truth corresponding to the generated synthetic images 600.

At block 806 the computing device 115 generates synthetic images 700 corresponding to underrepresented noise factors based on the synthetic images 600. The underrepresented noise factors include motion blur, lighting, and environmental conditions such as rain, snow, fog, dust, etc. The simulated images 700 including corresponding ground truth are added to a training dataset for a CNN 200.

At block 808 computing device 115 trains a CNN 200 using the training dataset including the synthetic images 700 and corresponding ground truth. Because the training dataset includes images corresponding to underrepresented object configuration and underrepresented noise factors, the probability that the CNN 200 will correctly identify a motorcycle 406, for example, in data acquired by a camera in a vehicle 110 while the vehicle 110 is operating on a roadway. The trained CNN 200 can be downloaded to a vehicle 110 and used to process acquired image data from a vehicle sensor 116. The CNN 200 can also be included in an edge computing node 170 and process data acquired by a camera 180 included in a traffic infrastructure system 100. Object label and location data output from the CNN 200 can be used by a vehicle 110 or a traffic infrastructure system 100 to determine a vehicle path upon which to operate a vehicle 110. For example, a computing device 115 in a vehicle or an edge computing node 170 can use the object label and object location data to determine a polynomial path that avoids contact with the object. Following block 808 process 800 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
determine a second convolutional neural network (CNN) training dataset by:
determining an underrepresented object configuration and an underrepresented noise factor corresponding to an object in a first CNN training dataset;
generating one or more simulated images including the object corresponding to the underrepresented object configuration in the first CNN training dataset by inputting ground truth data corresponding to the object into a photorealistic rendering engine; and
generating one or more synthetic images including the object corresponding to the underrepresented noise factor in the first CNN training dataset by processing the simulated images with a generative adversarial network (GAN);
train the CNN using the first and the second CNN training datasets; and
input an image acquired by a sensor to the trained CNN and output an object label and an object location corresponding to the object corresponding to the underrepresented object configuration and underrepresented object noise factor; wherein the trained CNN is executed on a second computer in a vehicle and the object label and the object location are used by the second computer to operate the vehicle by controlling one or more of vehicle propulsion, vehicle brakes or vehicle steering.

2. The computer of claim 1, the instructions including further instructions to:
determine a second underrepresented noise factor that corresponds to the CNN not outputting the object label and the object location corresponding to the object by testing the CNN with a test dataset based on real world images;
generate one or more synthetic images including the object corresponding to the second underrepresented noise factor to determine a third CNN training dataset by inputting images from the first training dataset and the second training dataset into the GAN; and
retrain the CNN using the third training dataset to output a second object label and a second object location corresponding to the second underrepresented noise factor using the first, second and third CNN training datasets.

3. The computer of claim 1, wherein the first object configuration is underrepresented when a number of images in the first CNN training dataset that include the first object configuration is less than an average number of images that include each other object configuration.

4. The computer of claim 1, wherein the first noise factor is underrepresented when a number of images in the first CNN training dataset that include the first noise factor is less than an average number of images that include each other noise factor.

5. The computer of claim 1, wherein the first and second CNN training datasets include images that include the object and corresponding ground truth that includes the object label and the object location for the object included in the images.

6. The computer of claim 1, wherein training a second CNN with the second CNN training dataset reduces false positives output by a first CNN trained with the first CNN training dataset when processing real-world data, and wherein a false positive is an object label incorrectly applied to an object occurring in an image.

7. The computer of claim 1, wherein the object label is a text string that identifies an object included in an input image and the object location is a bounding box corresponding to the object included in the input image.

8. The computer of claim 1, wherein object configurations include values and an arrangement of pixels corresponding to the object based on an object location, an object orientation, and partial obscuring of the object by another object and/or another object's shadow.

9. The computer of claim 1, wherein noise factors include values and an arrangement of pixels corresponding to the object based on environmental conditions including one or more of partial sunlight, full sunlight, rain, snow, fog, and dust.

10. The computer of claim 9, wherein the photorealistic rendering engine is a software program that inputs ground truth data regarding object configuration and outputs an image.

11. The computer of claim 1, wherein the GAN is trained to generate simulated images by training the GAN with real-world images that include noise factors.

12. The computer of claim 11, wherein training the GAN with real-world images includes comparing an image output by the GAN with input real-world images to determine similarity between the image output by the GAN with input real-world images by correlating the output images with the input real-world images.

13. The computer of claim 1, wherein the CNN includes convolutional layers that output hidden variables to fully-connected layers output states that include the object label and object location.

14. The computer of claim 1, wherein the CNN is trained to output states corresponding to the object label and object location by processing an input image a plurality of times and comparing the output states to ground truth data corresponding to the input image.

15. The computer of claim 1, wherein the vehicle is operated by the second computer by controlling one or more of a powertrain controller, a brake controller, and a steering controller.

16. The computer of claim 15, wherein operating the vehicle includes determining a vehicle path by a second computer that avoids contact with the object.

17. A method, comprising:
determining a second convolutional neural network (CNN) training dataset by:
determining an underrepresented object configuration and an underrepresented noise factor corresponding to an object in a first CNN training dataset;
generating one or more simulated images including the object corresponding to the underrepresented object configuration in the first CNN training dataset by inputting ground truth data corresponding to the object into a photorealistic rendering engine; and
generating one or more synthetic images including the object corresponding to the underrepresented noise factor in the first CNN training dataset by processing the simulated images with a generative adversarial network (GAN) to determine a second CNN training dataset;
training the CNN using the first and the second CNN training datasets; and inputting an image acquired by a sensor to the trained CNN and outputting an object label and an object location corresponding to the underrepresented object configuration and underrepresented object noise factor wherein the object label and the object location are used to operate a vehicle by controlling one or more of vehicle propulsion, vehicle brakes or vehicle steering.

18. The method of claim 17, further comprising:

determining a second underrepresented noise factor that corresponds to the CNN not outputting the object label and the object location corresponding to the object by testing the CNN with a test dataset based on real world images;

generating one or more synthetic images including the object corresponding to the second underrepresented noise factor to determine a third CNN training dataset by inputting images from the first CNN training dataset and the second CNN training dataset into the GAN; and retraining the CNN using the third CNN training dataset to output a second object label and a second object location corresponding to the second underrepresented object noise factor using the first, second, and third CNN training datasets.

19. The method of claim 17, wherein a first object configuration is underrepresented when a number of images in the first CNN training dataset that include the first object configuration is less than an average number of images that include each other object configuration.

20. The method of claim 17, wherein a first noise factor is underrepresented when a number of images in the first CNN training dataset that include the first noise factor is less than an average number of images that include each other noise factor.

* * * * *